United States Patent
Angué et al.

(10) Patent No.: US 7,225,722 B2
(45) Date of Patent: Jun. 5, 2007

(54) LINEAR DRIVE

(75) Inventors: Eric Angué, Kornwestheim (DE);
Simone Kopp, Esslingen (DE)

(73) Assignee: Festo AG & Co., Esslingen (DE)

( * ) Notice: Subject to any disclaimer, the term of this patent is extended or adjusted under 35 U.S.C. 154(b) by 196 days.

(21) Appl. No.: 11/056,847

(22) Filed: Feb. 11, 2005

(65) Prior Publication Data
US 2005/0188836 A1 Sep. 1, 2005

(30) Foreign Application Priority Data
Mar. 1, 2004 (EP) ................... 04400014

(51) Int. Cl.
F15B 15/02 (2006.01)
B23Q 1/58 (2006.01)
(52) U.S. Cl. ........................ 92/88; 92/165 R
(58) Field of Classification Search ................. 92/13.5, 92/88, 146, 165 R
See application file for complete search history.

(56) References Cited

U.S. PATENT DOCUMENTS

| 4,013,280 | A | | 3/1977 | Chitayat et al. |
|---|---|---|---|---|
| 4,726,283 | A | | 2/1988 | Miyamoto |
| 4,796,516 | A | * | 1/1989 | Horvath ..................... 92/165 R |
| 5,363,741 | A | * | 11/1994 | Takada et al. ............... 92/13.5 |
| 5,484,210 | A | * | 1/1996 | Gallone ....................... 384/49 |
| 5,511,461 | A | * | 4/1996 | Miyachi et al. .............. 92/13.5 |
| 5,606,902 | A | * | 3/1997 | Hosono et al. ................. 92/88 |
| 5,617,772 | A | * | 4/1997 | Hosono et al. ........... 92/117 A |
| 6,014,924 | A | * | 1/2000 | Stoll et al. ................... 92/13.5 |

FOREIGN PATENT DOCUMENTS

| DE | 3513214 A | * | 10/1986 |
|---|---|---|---|
| EP | 0 683 010 B1 | | 11/1995 |
| EP | 0 713 748 B1 | | 5/1996 |

* cited by examiner

*Primary Examiner*—Thomas E. Lazo
(74) *Attorney, Agent, or Firm*—Hoffman & Baron, LLP

(57) ABSTRACT

A linear drive has a drive housing on which a carriage is able to run. For guiding the carriage two guide units are provided, which jointly lie in a guide plane extending perpendicularly to the upright axis of the drive housing. The guide units flank the carriage on the longitudinal side, the guide plane being arranged offset in the direction of the upright axis in relation to a drive space formed in the drive housing, drive means for the carriage being located in the drive space. At an edge section on the longitudinal side the carriage overlaps at least a part of the drive space.

15 Claims, 8 Drawing Sheets

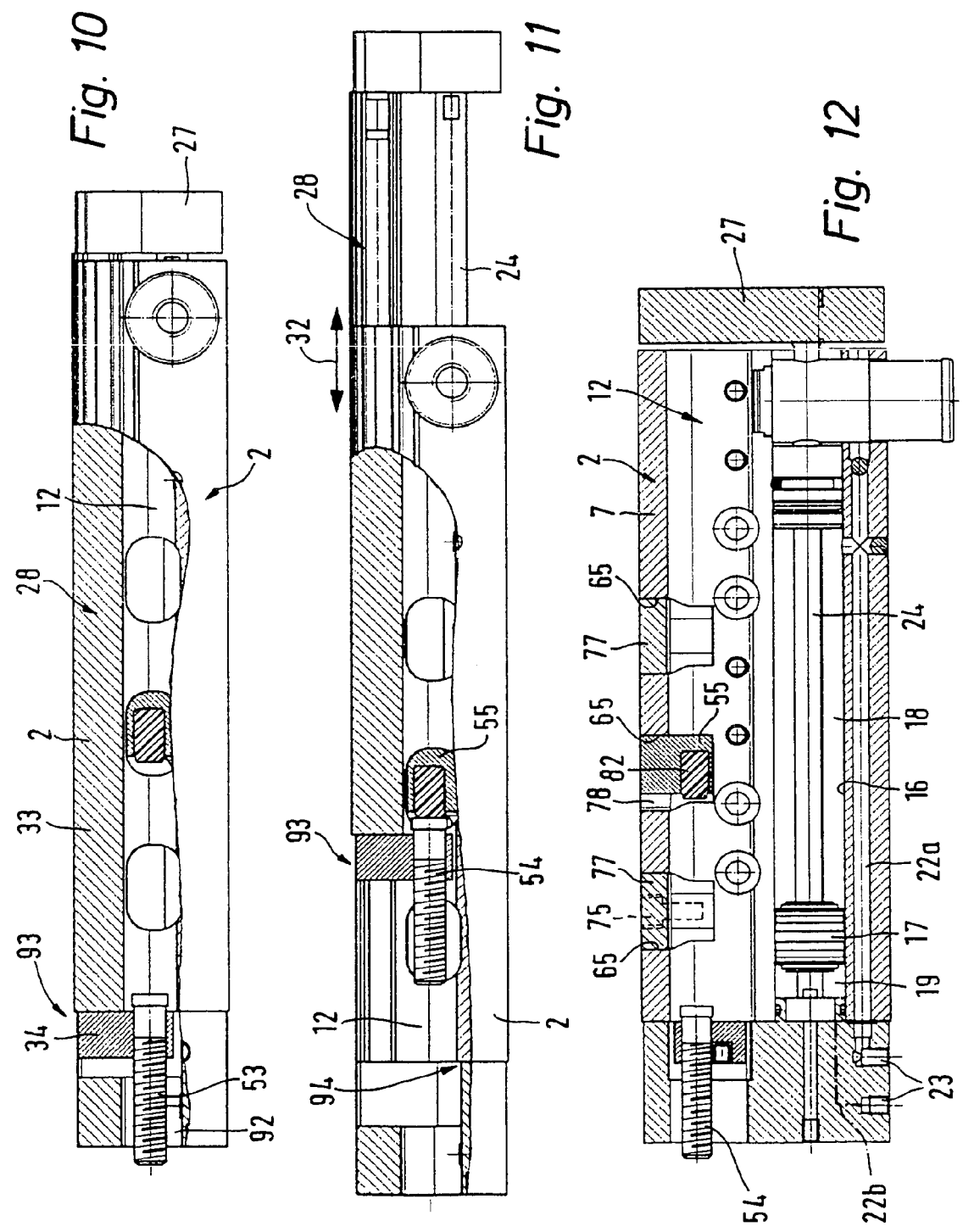

LINEAR DRIVE

BACKGROUND OF THE INVENTION

The invention relates to a linear drive comprising a drive housing with longitudinal axis, a transverse axis and an upright axis in a Cartesian coordinate arrangement, such drive housing defining a longitudinally extending drive space arranged off center in the direction of the transverse axis and in which drive means are located able to be driven to perform a linear movement, such drive means being drivingly coupled with a carriage or slide adapted for linear movement externally on the drive housing and guided by way of a guide means, the guide means having two guide units which are parallel and arranged with a distance between them in a guide plane perpendicular to the upright axis, said guide units respectively including a guide track on the housing side.

THE PRIOR ART

A linear drive of this type disclosed in the European patent publication 0 683 010 comprises a drive housing with steps on the top side, the working space being arranged in the transverse direction of the drive housing off center in an elevated housing section, while a carriage kinematically coupled with drive means placed in the drive space is guided linearly at the same level as the drive space alongside the same by means of a guide means on the drive housing. The guide means comprises two mutually parallel, spaced apart guide units in a guide plane perpendicular to the upright axis of the drive housing, which respectively comprise a housing guide track arranged on the drive housing. The two guide units are seated underneath the carriage and are straddled by lateral edge sections of the carriage. The small transverse distance resulting from this between the guide units impairs the strength of the carriage guide, more especially when it comes to moving comparatively are masses. Furthermore, the linear drive has a relatively large overall width.

The European patent publication 0 713 748 B1 discloses a linear drive, in the case of which the drive space is arranged centrally in the drive housing, the carriage being placed over the drive space in the direction of the upright axis. In this case as well the two guide units of the guide means are underneath the carriage and have a relatively small transverse distance apart so that tilting forces due to masses acting asymmetrically on the carriage or slide may in certain circumstances lead to greater wear.

SHORT SUMMARY OF THE INVENTION

One object of the invention is to create a linear drive which while having compact dimensions ensures a stable supporting action for the carriage by the guide means associated with it.

In order to achieve these and/or other objects appearing from the present specification, claims and drawings, in the present invention the carriage is flanked externally by the two guide units on the longitudinal side and the guide plane in the direction of the upright axis is arranged offset in relation to the drive space, one of the guide tracks on the housing side being over the drive space so that the drive space is straddled in the direction of the transverse axis for at least some distance by a longitudinal edge section of the carriage.

Thus the carriage is externally guided at its flanks longitudinally, something which results in there being a relatively large distance between the two guide units and the carriage is supported to resist the tilting forces acting on it. Since the carriage extends at its edge sections for at least some distance past the drive space, the width of the drive housing may be optimally utilized, the component, defining the drive space, of the drive housing functioning simultaneously as a support for the guide track of the associated guide unit. Owing to the lateral guidance of the carriage there is furthermore the possibility of employing the intermediate space between the carriage and the drive housing for stroke limiting measures.

Further advantageous developments of the invention are defined in the claims.

It has turned out to be advantageous to so arrange the carriage or slide that it does not extend past the drive space for the full width. Accordingly an edge section of the drive housing, adjoining the edge section of the carriage will remain, in which at least one longitudinally extending anchoring slot may be provided, which renders possible the attachment of sensors serving for interrogation of position. An optimum arrangement is found to be one in which the guide track associated with the drive space of the housing side is so placed that it essentially lies over the top apex portion, orientated in the direction of the upright axis, of the drive space.

Laterally alongside the drive space the drive housing preferably possesses a channel-like housing recess, whose open longitudinal side is overlapped by the carriage, each of the two side walls of the housing recess having one of the housing guide tracks associated with it and the carriage covering the housing recess in accordance with the current carriage position assumed along a more or less extensive length. Preferably, the carriage is so sunk, in the direction of the upright axis, into the channel-like housing recess that at its two longitudinal sides it is flanked by the side walls of the housing recess. The guide units are then also located here.

In order to set the desired end carriage position the linear drive is preferably provided with stroke limiting means effective between the carriage and the drive housing. These limiting means preferably comprise a first counter abutment arranged within the housing recess and overlapped by the carriage, such counter abutment, which is kinematically integral with the housing, cooperating with a first abutment arranged within the housing recess. A further pair of second abutments and counter abutments may be provided for stroke limiting in the opposite stroke direction.

The lateral wall, farther removed in the transverse axis direction, of the housing recess preferably has at least one wall opening, into which the counter abutment may be so inserted from the outside that it extends sideways into the housing recess and thence into the path of movement of the first abutment. In order to be able to set a particularly fine range of adjustment of carriage terminal positions, the side wall may have a plurality of wall openings spaced apart in the stroke direction of the carriage, such openings being to be selectively provided with the first counter abutment.

The channel-like housing recess is preferably terminally limited by a terminal wall at one end portion of the drive housing. This terminal wall may have a window-like opening flush with the first abutment in the stroke direction of the carriage, the first abutment being accessible through such opening for any necessary adjustment. Moreover, the length sections, axially overlapping the carriage, of the first abutment may fit into the window-like opening or even extend right the way through such opening, when the carriage reaches the corresponding carriage end position. Thus particularly compact longitudinal dimensions of the linear drive are possible.

In conjunction with the window-like opening it is possible for the end portion of the carriage to be designed as an ejection head, which ejects and clears any dirt which may have collected in the channel-like housing recess during motion of the carriage through the window-like opening. Accordingly functional impairments otherwise due to fouling by dirt may be prevented.

The linear drive could in principle be designed for piston rod-less force transmission between the drive means and the carriage. However, a design is found to be particularly advantageous in which the drive means are connected with the carriage by way of coupling rod extending out of the end of the drive housing. If a range of adjustment of the carriage is desired, the drive housing may have a clamping unit in it, which has the coupling rod extending through it, something which simultaneously permits arresting the kinematically coupled carriage.

Further advantageous developments and convenient forms of the invention will be understood from the following detailed descriptive disclosure of embodiments thereof in conjunction with the accompanying drawings.

LIST OF THE SEVERAL VIEWS OF THE FIGURES

FIG. 10 is a longitudinal section in the operational condition of FIG. 8 and on the section line X—X of FIG. 5.

FIG. 11 shows a longitudinal section in the operational position of FIG. 9 again on the section line X—X.

FIG. 12 shows a further longitudinal section taken through the linear drive in the retracted position of the carriage and on the section line XII—XII of FIG. 5.

DETAILED ACCOUNT OF WORKING EMBODIMENTS OF THE INVENTION

Figure 1:
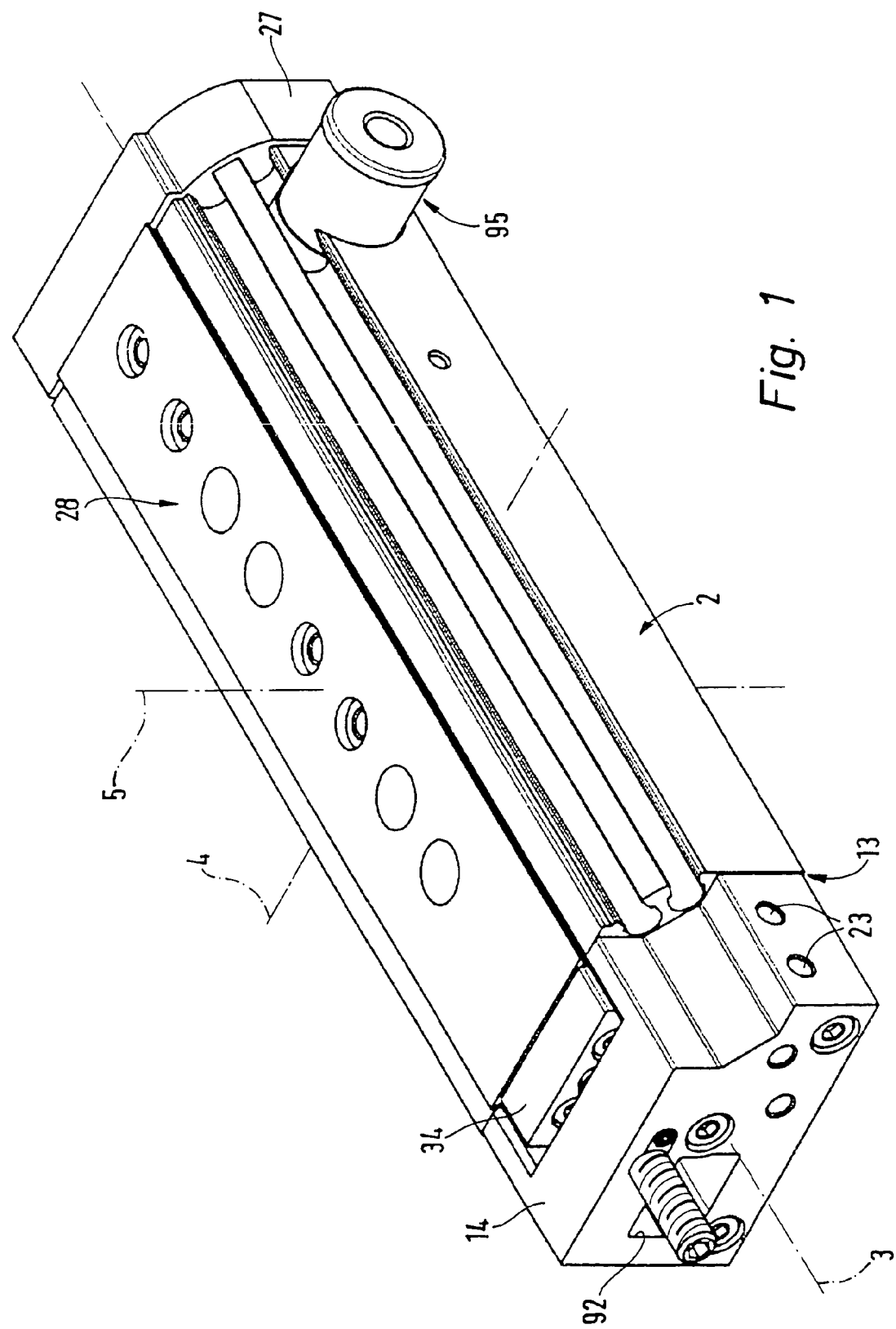
FIG. 1 shows a first preferred design of the linear drive in a perspective rear view with the carriage retracted.

The linear drive depicted in the drawings is designed for operation using fluid power, although it could also be electrically activated.

The linear drive possesses a drive housing 2 having an elongated configuration with a longitudinal axis 3, a transverse axis 4 perpendicular thereto and an upright axis 5 again perpendicular to the two above mentioned axes. The said three axes thus subtend a Cartesian coordinate system.

The drive housing 2 is in cross section preferably U-like (see more especially FIGS. 6 and 7), the housing sections corresponding to the two U limbs defining two first and second side walls 6 and 7 parallel to each other in the direction of the longitudinal axis 3. The housing section corresponding to the U cross stroke constitutes a floor wall 8, which together with two side walls 6 and 7 delimit a channel-like housing recess 12, which is open at the longitudinal side opposite to the floor wall 8.

At the rear end side 13 the channel-like housing recess 12 is delimited by an end terminal wall 14 mounted on the end face of the drive housing 2. At the opposite front end side 15 the housing recess 12 on the other hand is however open.

In the direction of the transverse axis 4 the first side wall 6 has a greater thickness than the comparatively narrow second side wall 7. This is because of a peripherally enclosed cavity extending longitudinally formed in the interior, which is here termed the drive space 16, since in it there are drive means 17 able to be driven to perform a linear translatory motion in the direction of the longitudinal axis 3.

In the working embodiment the drive means 17 comprise a piston able to run in the drive space 16 and which divides up the drive space 16 in a sealing manner into a front and a rear working chamber 18 and 19. Into each working chamber 18 and 19 there opens a separate fluid duct 22*a* and 22*b*, through which a fluid medium may be supplied or removed in order to so act on the piston 17 in a controlled manner that same is shifted in the desired fashion. The fluid supply is by way of flexible fluid pipes, not illustrated in detail, which are able to be connected with connection openings 23 communicating with the fluid ducts 22*a* and 22*b,* such openings preferably being located of the outer face of the terminal end wall 14.

A coupling rod 24 in the form of piston rod is attached on the one hand to the piston 17 and extends at the other end at the front end side 15 out of the drive housing 2. It extends in a sealed manner through a stuffing box 25 or cover inserted into the drive space 16 from the front end side 15, such box 25 being axially held in place by a transverse pin 26 extending right the way through the drive housing 2. The rear sealed termination of the drive space 16 is provided by the terminal end wall 14, which covers the opening of the drive space 16.

The end section, extending out of the drive housing 2, of the coupling rod 24 is joined to a connecting yoke 27 in a manner resisting push and pull forces, such yoke 27 being a component of a carriage or slide 28 movingly mounted on the outside of the drive housing 2 for linear movement in the direction of the longitudinal axis 3. Accordingly the drive means 17 are kinematically coupled with the carriage 28 and the carriage 28 performs a linear stroke movement 32 on corresponding actuation of the drive means 17.

Figure 6:
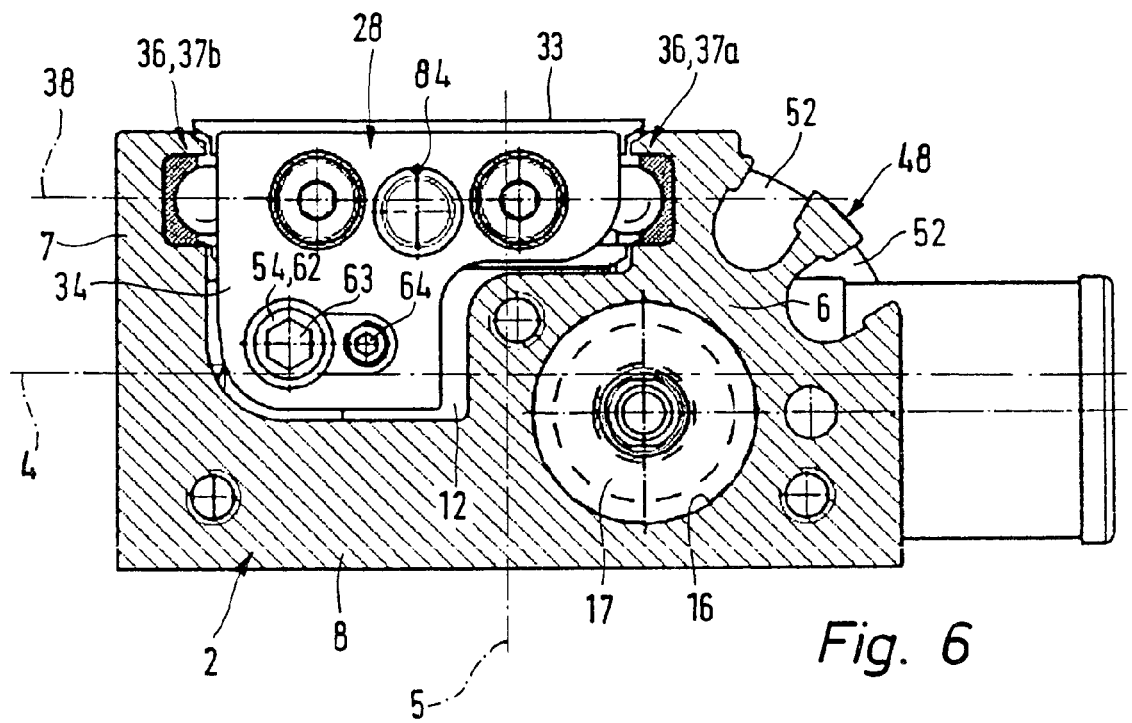
FIG. 6 shows a cross section taken through the linear drive on the section VI—VI in FIG. 2.
Figure 7:
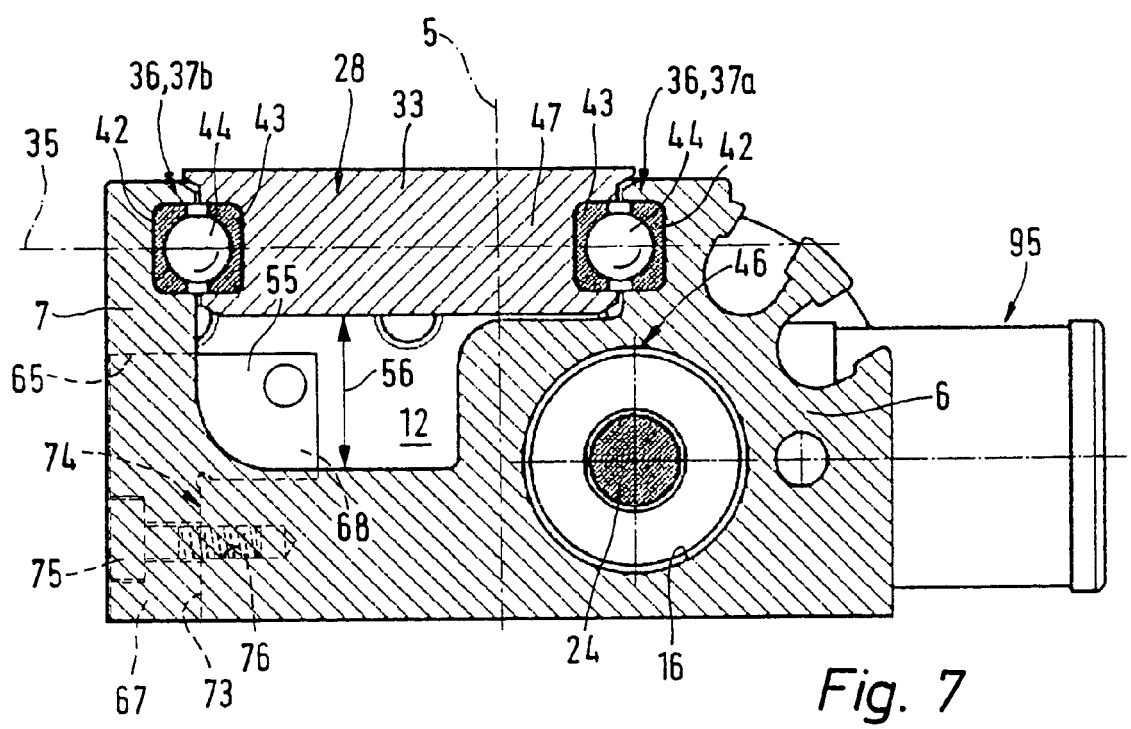
FIG. 7 is a cross section taken through the linear drive on the section line VII—VII in FIG. 2.
Figure 8:
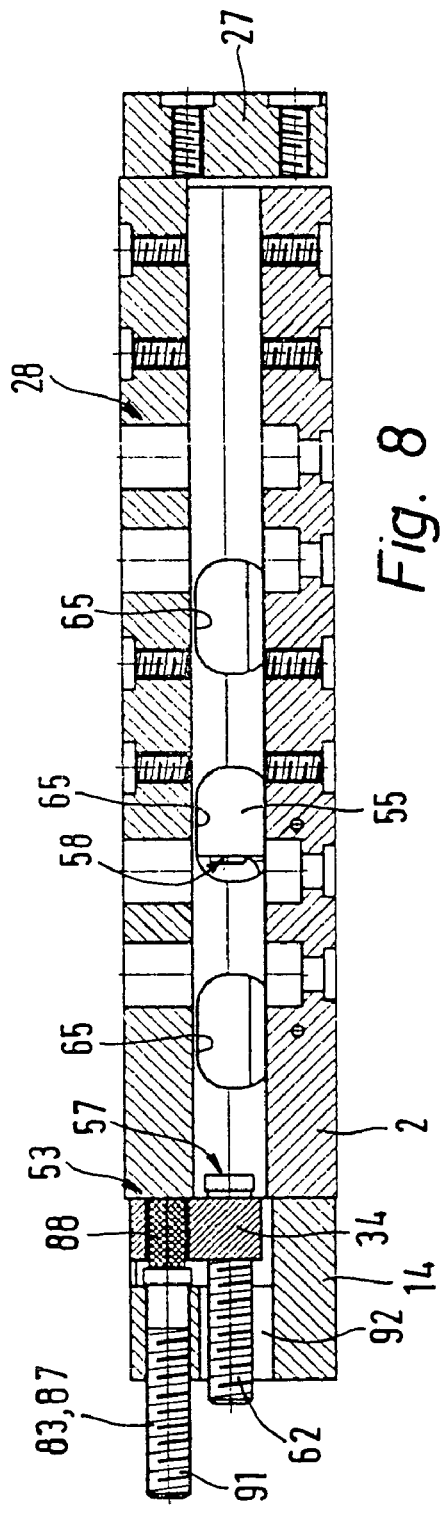
FIG. 8 shows the linear drive with the carriage in the retracted position on the section line VIII—VIII of FIG. 5.
Figure 9:
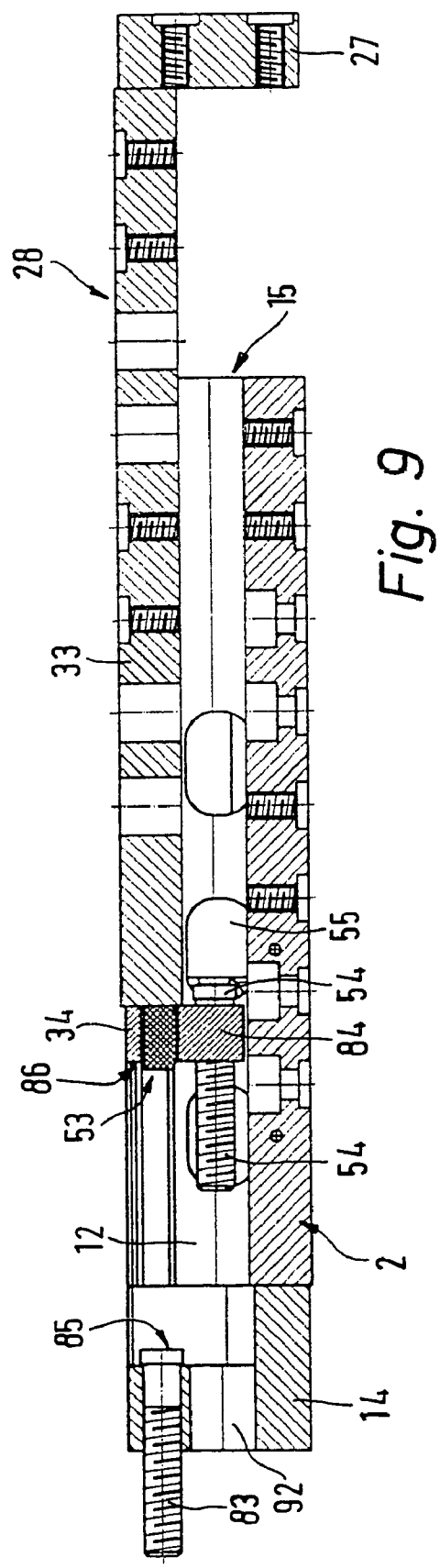
FIG. 9 is a longitudinal section of the linear drive on the section line VIII—VIII of FIG. 5, the carriage assuming the extended position in accordance with FIGS. 2 and 4.
Figure 13:
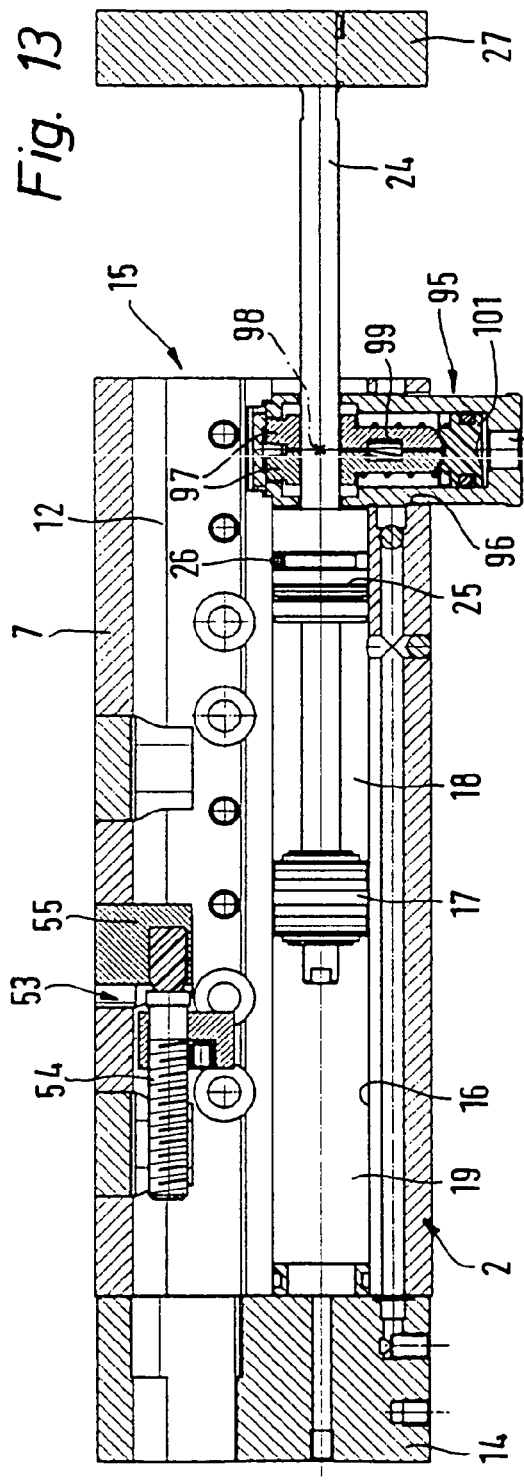
FIG. 13 shows a section as in FIG. 12 through the linear drive with the carriage assuming the extended position thereof.
Figure 14:
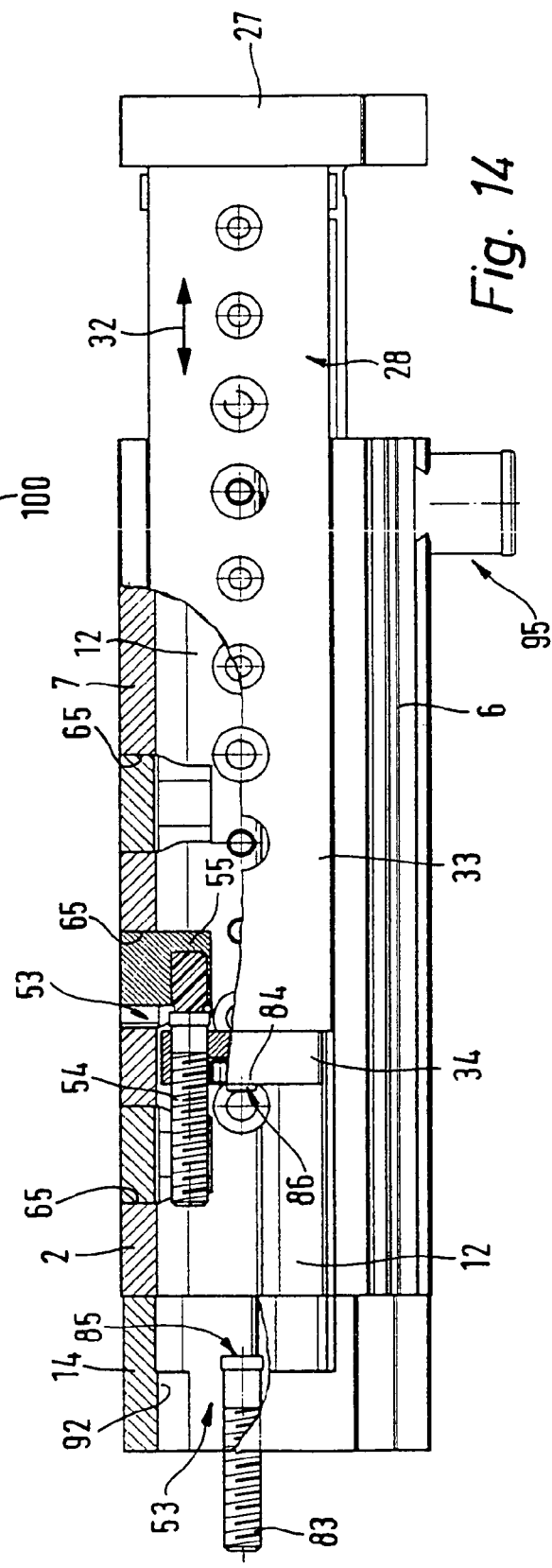
FIG. 14 shows a partly broken away plan view of the linear drive looking in the direction of the arrow XIV in FIG. 5 with the carriage in the extended position.

As more particularly shown in FIGS. 6 and 7 the drive space 16 assumes an off center position within the drive housing 2 as related to the transverse axis 4. The center of the drive space 16 is consequently offset in the direction of the transverse axis 4 in relation to the cross section center of the drive housing 2 toward the housing edge.

The carriage 28 on the other hand is related to the channel-like housing recess 12, it having a plate-like principal carriage part 33 adjoining the connecting yoke 27 in the direction of the longitudinal axis 3, and on the rear side of the part 33 opposite to the connecting yoke 27 there is furthermore a preferably plate-like support wall 34.

The principal carriage part 33 is so aligned that its plane 35 of extent extends perpendicularly to the upright axis 5.

Figure 2:
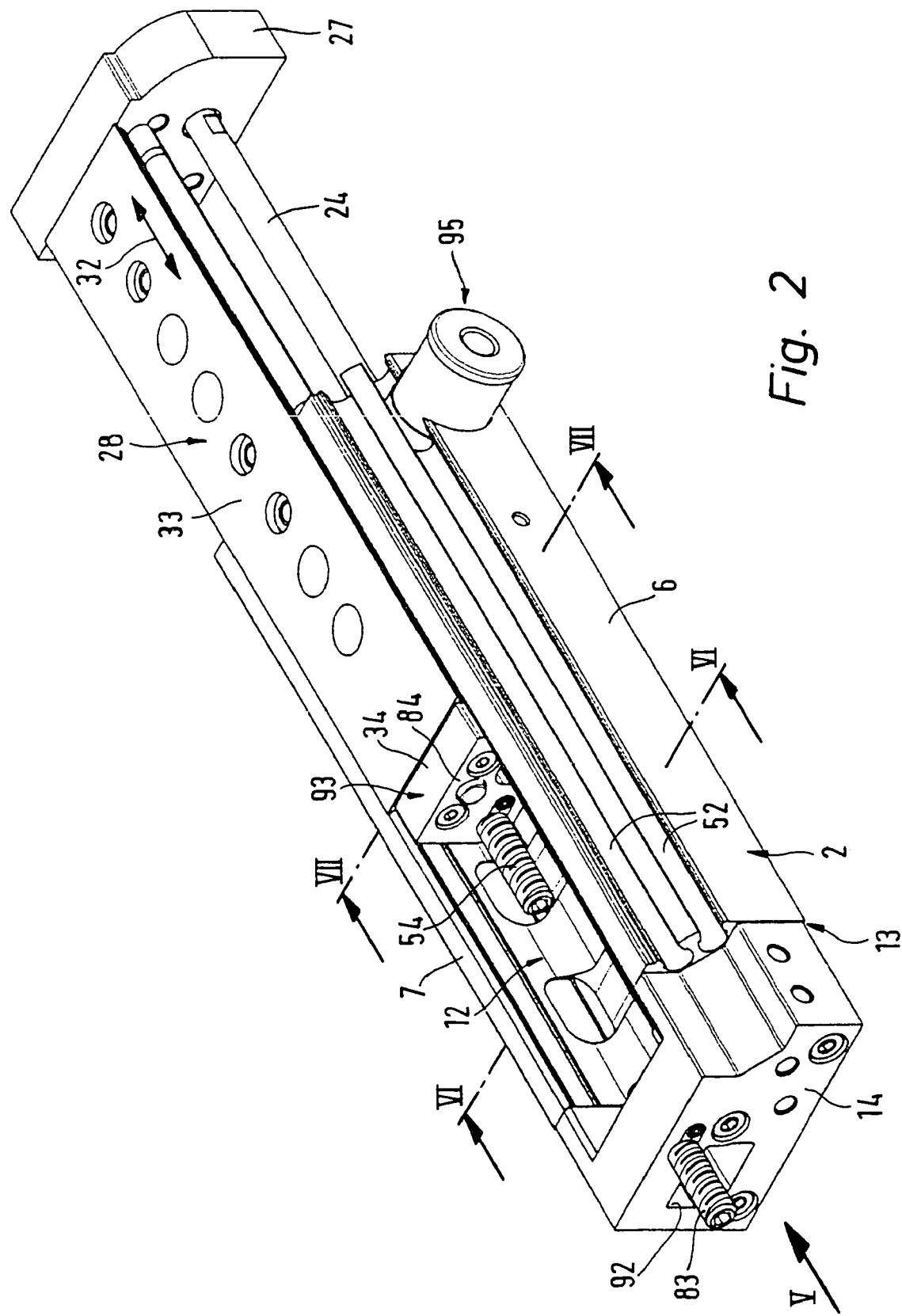
FIG. 2 shows the linear drive of FIG. 1 in a corresponding representation with the carriage extended.
Figure 3:
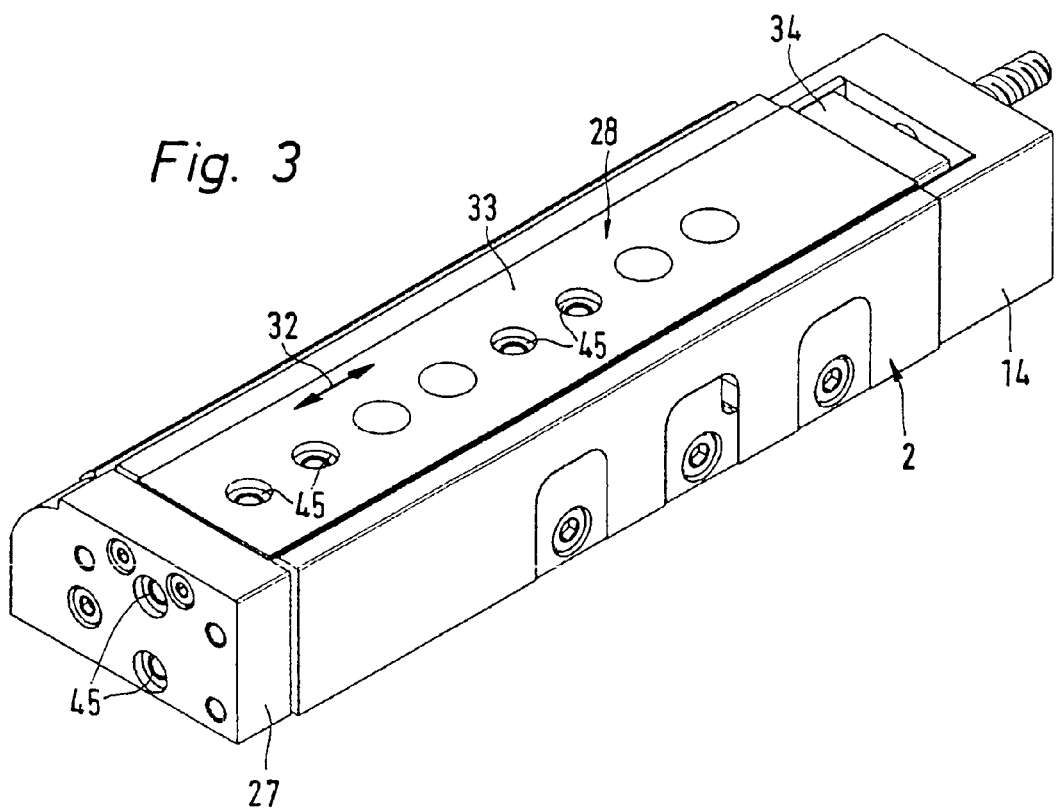
FIG. 3 is a perspective front view of the linear drive in the condition of FIG. 1.
Figure 5:
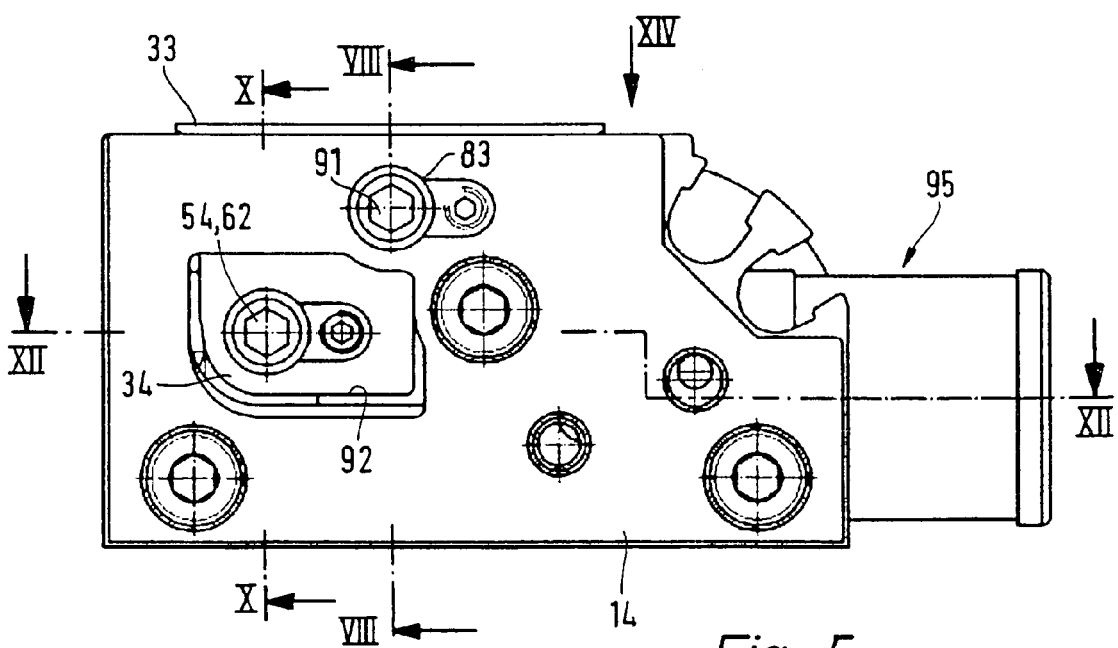
FIG. 5 shows the rear side of the linear drive looking in the direction of the arrow V in FIG. 2.
Figure 4:
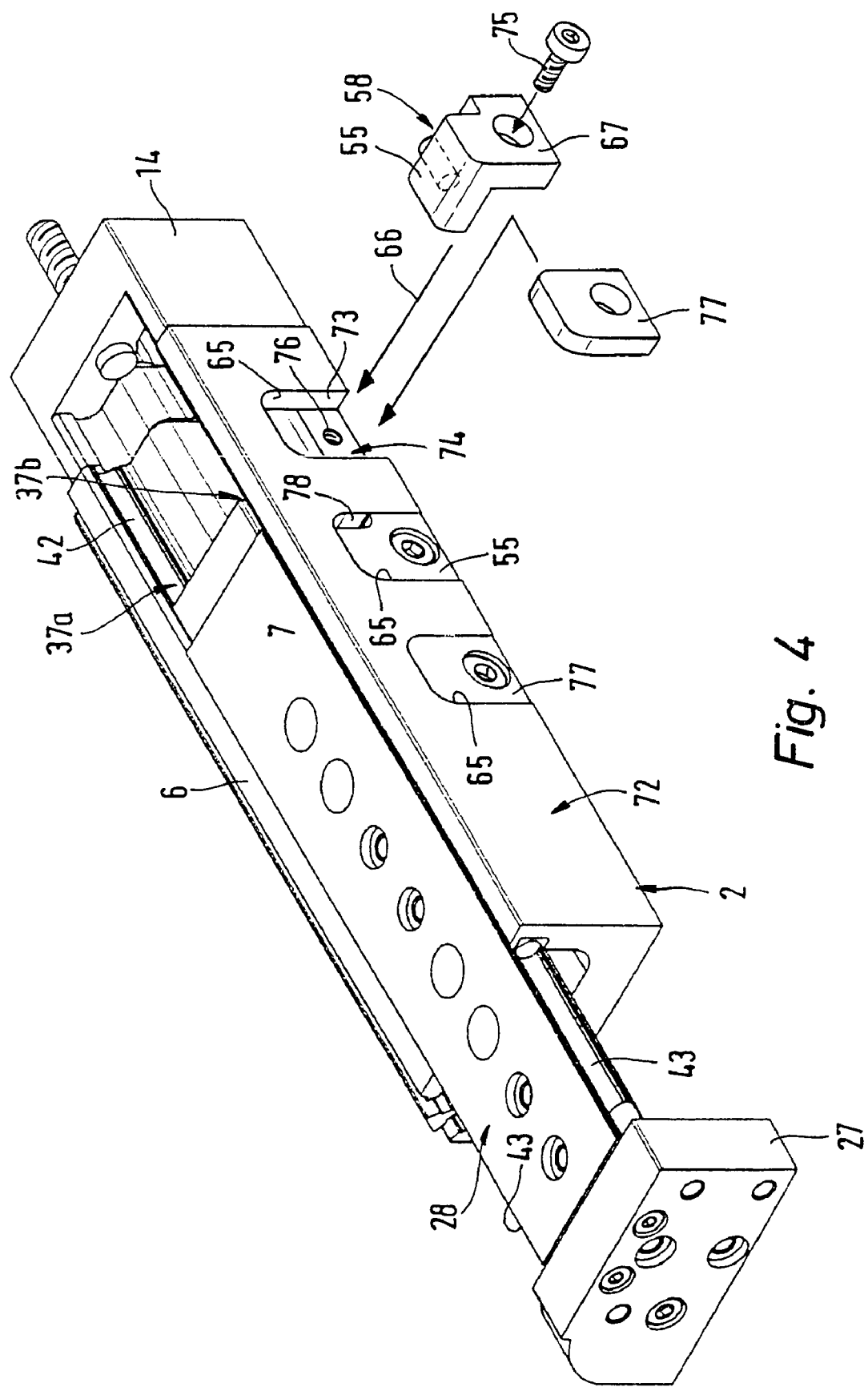
FIG. 4 is a perspective front view of the linear drive in the condition of FIG. 2, the use of a substitute first counter abutment being indicated.

The length of the carriage 28 is essentially the same as that of the drive housing 2, the carriage 28 more particularly having its principal part 33 extending at and along the open longitudinal side of the channel-like housing recess 12. Accordingly it practically constitutes a cover for the open longitudinal side of the housing recess 12, the covered length being capable of adjustment and being dependent on the current position of the carriage 28. If the coupling rod 24 is moved as far as possible into the drive space 16, there will be the retracted carriage position illustrated in FIGS. 1 and 3, in which the carriage 28 covers over the channel-like housing recess 12 for practically its entire length. If the coupling rod 28 on the other hand is extended farther out of the drive housing 2, the carriage 28 as well will extend farther out past the front end side 15 of the drive housing 2 so that now only the length section, corresponding to the front end side 15, of the housing recess 12 is covered by the carriage 28, whereas the housing recess 12 is in other respects left free (FIGS. 2 and 4).

The carriage 28 is so sunk into the channel-like housing recess 12 in the direction of the upright axis 5 that it is flanked at its two longitudinal sides by the two side walls 6 and 7. This is made clear in FIG. 7. As a result the carriage 28 does not extend, or only hardly extends, in the direction of the upright axis 5 past the drive housing 2, something which means a comparatively small overall height For guiding and supporting the carriage 28 in relation to the drive housing 2 a guide means 36 is provided, which has two parallel guide units 37a and 37b arranged at a distance apart, which are placed in the direction of the transverse axis 4 between the carriage 28 and the drive housing 2. Stated more precisely, the carriage 28 is flanked at its mutually opposite longitudinal sides externally by the two guide units 37a and 37b, each guide unit 37a and 37b again being flanked by an end section of the side walls 6 and 7 extending past the carriage 28. In accordance with FIGS. 6 and 7 the two guide units 37a and 37b jointly extend in a guide plane 38, perpendicular to the upright axis 5, such guide plane 38 coinciding in the working embodiment with the plane 35 of extent of the principal carriage part 33.

Each guide unit 37a and 37b possesses a housing side guide track 42 arranged on the inner side (facing the respectively other side wall) of the associated first and second side wall 6 and 7. These housing side guide tracks 42 preferably extend along the entire length of the drive housing 7. Each housing side guide track 42 is opposite to a carriage side guide 43 track in the direction of the transverse axis 4, such track extending along the principal carriage part 33. Between each pair of mutually associated housing side and carriage side guide tracks 42 and 43 there is a bearing element arrangement 44, which more especially comprises a group of anti-friction bearing elements collected in a cage. If the carriage 28 performs a stroke movement 32, the bearing element arrangement 44 will run along the guide tracks 42 and 43 cooperating with it so that there is a precise guiding action for the carriage 28.

The guide tracks 42 and 43 are preferably formed on bar-like guide elements, which are permanently applied to the drive housing 2 or, respectively, the carriage 28.

By means of the guide means 36 forces acting on the carriage 28 and transmitted to the drive housing 2. These forces may originate at any mass, which is attached to the carriage 28 for the purpose of changing its position. In the case of such mass it can for example be a question of a component of a machine or of a further linear drive. Attachment means 45 arranged on the carriage 28, for example in the form of threaded holes, render possible the detachable coupling of the respective load. Such attachment means 45 are preferably provided both on the principal carriage part 3 and also on the connecting yoke 27.

The guide units 37a and 37b are preferably so installed that the resulting guide plane 38 is arranged in the direction of the upright axis 5 with an offset in relation to the drive space 16. The size of the offset is more particularly so selected that the principal carriage part 33 is higher in the direction of the upright axis 5 than the top apex portion 46 of the drive space 16. Thus in the working example there is the advantageous possibility of placing the housing side guide track 42 of the first guide unit 37a, associated with the first side wall 6, extending past the drive space 16 in the direction of the upright axis 5 so that in the direction of the transverse axis 4 the drive space 16 is overlapped at least for some distance by the longitudinal edge section 47 (bearing the carriage side guide track 43 of the first guide unit 37a) of the carriage 28.

More particularly there may be a provision such that the housing side guide track 42 of the first guide unit 37a is essentially located in the zone over the top apex portion 46 of the drive space 16.

The carriage 28 is accordingly so arranged that it overlaps the drive space 16 somewhat in the transverse direction of the drive housing 2, while on the other hand together with the two side walls 6 and 7 and the floor wall 8 it delimits a cavity, which in a manner remaining to be described is excellently suited for stroke limiting measures.

Since the guide units 37a and 37b are at a large distance from each other in the direction of the transverse axis 4, there is a satisfactory supporting action for the carriage 28 to resist tilting moments acting on it.

Preferably the carriage 28 also extends past the drive space 16 only a small distance so that alongside and adjacent to the associated edge section 47 of the carriage 28 there remains an uncovered edge section 48 of the first side wall 6 of the drive housing 2, which is able to be employed for the integration of one or more anchoring slots extending in the direction of the longitudinal axis 3. These anchoring slots 52 more particularly render possible the anchoring of sensors, with which a contact-free detection of positions of the drive means 17 arranged in the drive space 16 is possible. Accordingly the relevant principal positions of the carriage 28 may ultimately be detected.

Since the edge section 48 not covered by the carriage 28 of the second side wall 7 possesses a rounded outline, it is readily possible for several and more particularly two anchoring slots to be provided placed alongside each other without mutual hindrance.

The linear drive is provided with stroke limiting means 53, which render possible a range of adjustment of the stroke limitation of the carriage 28 in both directions of the stroke. Accordingly there is the possibility, irrespectively of the stroke as set by the drive means 17, of setting the desired carriage position in the extended position and the terminal carriage position desired in the retracted position. The stroke limiting means 53 act indirectly or directly between the drive housing 2 and the carriage 28.

In order to set the extended terminal carriage position a first abutment 54 arranged on the carriage 28 and a first counter abutment 55 secured to the housing and extending into the path of movement are provided. Both abutments are located within the channel-like housing recess 12 in the height section 56, which is defined, when carriage 28 is retracted, in the height direction between the carriage 28 and the floor wall 8.

The first abutment 54 is arranged on the rear end side, facing the end side terminal wall 14, of the carriage 28, such first abutment preferably being arranged on the section, extending into the height section 56, of the support wall 34. The first abutment 54 has a first abutment face 57 orientated in the extension direction, that is to say facing toward the connecting yoke 27, such first face 57 facing a first counter abutment face 58 arranged on the first counter abutment 55, the first counter abutment 55 being located in a portion of the channel-like housing recess 12 overlapped or straddled by the principal carriage part 33. The first counter abutment 55 is consequently shielded off from the surroundings by the carriage 28.

In the working embodiment the first abutment 54 is in the form of an abutment screw 62, which extends through the support wall 34, there being an abutment head, bearing the first abutment face 57, underneath the carriage 28, whereas an adjustment shank, provided with a thread, projects to the rear toward the end side terminal wall 14 from the support wall 34. At the free end of the adjustment shank of the abutment screw 62 there is an actuation part 63 rendering possible the engagement of a screw driver or the like, there being the possibility of turning the abutment screw 62 to adjust, more particularly in a stepless manner, the axial position of the first abutment face 57 in relation to the carriage 28. Suitable locking means 64 permit holding the adjustment made with a lock nut effect.

For the installation of the first counter abutment 55 the second side wall 7 farther removed from the drive space 16 in the direction of the transverse axis 4, is provided with a plurality of wall openings 65, which respectively connect the channel-like housing recess 12 with the surroundings of the drive housing 2, the first counter abutment 55 being so inserted from the outside into one of the wall openings 65 that it protrudes laterally into the housing recess 12 and thence into the path of motion of the first abutment 54.

The wall openings 65 are arranged some distance apart in the stroke direction of the carriage 28. Accordingly by selective adaptation of one of these wall openings 65 the possible extension stroke and accordingly the preset terminal extended position may be approximately set in several steps. In the working embodiment there are in all three wall openings 65, the first counter abutment 55 being installed in the middle wall opening 65. It could however for example, as is indicated in FIG. 4, be inserted in one of the two other wall openings 65 in order to ensure that the carriage is extended in the end position to a greater or lesser distance from the drive housing 2.

There is therefore the possibility using a suitable design of the wall openings 65 with a first counter abutment 55 to provide for a coarse setting of the extension stroke in order then to undertake subsequent fine adjustment.

The number of the wall openings 65 and their distance apart is as a rule adapted to the overall length of the drive housing 2 and the maximum possible carriage stroke. If the maximum possible carriage stroke is for example very small, even a single wall opening 65 may be sufficient for the installation of a first counter abutment 55 so that then further setting may be performed exclusively by adjustment of the first abutment 54.

As viewed in the insertion direction 66 the outline of the first counter abutment 55 is so adapted to the inner outline or contour of the respective wall opening 65 that the insertion is a plugging operation, in which an interlocking connection between the first counter abutment 55 and the drive housing 2 is produced ensuring support of the first counter abutment 55 in the stroke direction of the carriage 28, at least in its extension direction.

Preferably the first counter abutment 55 possesses a holding part 67 and an abutment part 68 having a smaller cross section than it, the abutment part having the entire counter abutment face 58 and projecting in the insertion direction in relation to the holding part 67. The wall opening 65 is stepped in the insertion direction 66 and becomes wider toward the outer face 72 as far as an attachment section 73 which is partly delimited by an outwardly facing attachment face 74 defined by the floor wall 8. In the inserted condition the holding part 67 contacts the attachment face 74, whereas the abutment part 68 extends past the attachment face 74 into the housing recess 12. By means of a housing section having a releasable screw connection between the holding part 67 and the attachment face 74 it is possible for the first counter abutment 55 to be reliably held in place. As an example in this connection there is an attachment screw 75, which is extends through the holding part 67 with a supporting effect and is able to be screwed into a threaded hole, open toward the attachment face 74, in the drive housing 2.

The wall opening 65 not currently required for abutment purposes may however be closed in a releasable manner by a cover 77, which for example is attached in the same fashion as the first counter abutment 55 or however by a detent or catch connection. Sealing off using a cover will prevent the entry of dirt. While the first counter abutment 55 is more particularly made of metal, the covers employed may certainly be made of plastic material.

The configuration is more especially so selected that in the installed state of the first counter abutment 55 and of the covers 77 there is a termination flush with the outer face 72 of the drive housing 2.

In order in case of need to check the stroke limiting function in the working example the outline of the first counter abutment 55 is so designed that it does not completely comply with the inner outline or contour of the associated wall opening 65 so that between the two outlines there is a continuous free space defining a window 78 through which it is possible to view the abutment part 68 placed in the housing recess 12.

In order to minimize mutual impact the counter abutment 55 is fitted with a buffer element 82 of rubber elastic material extending toward the first abutment 54. In addition or as an alternative more particularly the first abutment 54 might be designed not in the form of a simple fixed abutment but as one combined with shock absorber means.

In order as well to adjust the terminal extended position of the carriage or slide, the stroke limiting means 53 comprise furthermore a second abutment 83 borne by the drive housing 2 and which preferably is arranged on the end side terminal wall 14 and possesses a second abutment face 85 facing the carriage 28 in the direction of the longitudinal axis 3. The abutment face 85 is opposite to a second counter abutment face 86 orientated in the retraction direction of the carriage and provided on a second counter abutment 84 arranged at the rear end portion of the carriage 28. The counter abutment 84 is in the working embodiment formed directly by the end face of the support wall 34, whereas the second abutment 83 is, like the first abutment 54, in the form of an abutment screw 87, which is screwed right the way through the end side terminal wall 14 and may be adjusted in relation to same axially. The adjustment and locking in position take place in the same manner as with the abutment screw 62 constituting the first abutment 54.

In the working embodiment the second abutment 83 is also provided with a buffer element 88.

For all abutment means there is the possibility of providing shock absorber means if required, either separately or in combination with the respective abutment in order to more especially to provide for fluid end position damping, as for example using hydraulic shock absorbers.

The second abutment 83 is readily accessible from the rear side of the drive housing 2 for adjustment of the retracted carriage position, since its actuating part 91 of the abutment 83 adapted for engagement of an adjusting tool lies on the outer side, opposite to the carriage 28, of the end side terminal wall 14.

In order to perform similar adjustment of the first abutment 54 as well the terminal wall 14—flush with the first abutment 54 in the stroke direction of the carriage 28—is provided with a window-like opening 92. Through such opening 92 actuation of the first abutment 54 is possible for adjustment purposes irrespectively of the stroke position of the carriage 28.

There is furthermore the advantage that the length section, projecting past the carriage 28 at the rear of the first abutment 62, may plunge into the window-like opening 92 or may even extend right the way through the opening 92, when the rear end portion of the carriage 28, in the retracted carriage end position, assumes a position in the direct vicinity of the terminal wall 14. This renders possible a substantial saving in the overall length of the drive housing 2.

In the working embodiment there is the further advantage that the end portion, bearing the first abutment 54, of the carriage 28—in the present case constituted by the support wall 34—functions as an ejection head 93 which during the retraction stroke of the carriage expels any dirt or foreign bodies present in the housing recess 12 out through the window-like opening 92 into the surroundings.

In order to ensure that such dirt is not retained by an obstructing step in the transition to the terminal wall 14, the inner outline of the window-like opening 92 preferably so designed that it is at least flush at the side and floor walls defining the housing recess 12 at least as far as the floor wall is concerned, and however preferably is even stepped back to a minimum extent athwart the longitudinal axis 3. The stepped back portion is referenced 94 in FIG. 11.

Contact between the ejection head 93 and the drive housing 2 is not necessary for ensuring the expulsion function and furthermore an elastic seal is generally unnecessary. Since the support wall 34 has an outer outline or contour essentially corresponding to the inner outline of the housing recess 12, an extremely small gap size may be observed so that the expulsion function is ensured even without contact being made. As shown in drawing the ejection head 93 extends at least approximately as far as the floor wall 8, opposite to the open longitudinal side of the housing recess 12, of the channel-like housing recess 12.

It is convenient for the linear drive to be provided with a clamping unit 95 by which the coupling rod 24 may be held during any desired time without being able to move in relation to the drive housing 2.

The clamping unit 95 is cartridge-like in design and inserted in the portion, which is axially to the fore of the connection yoke 27 in the terminal cover 25, from the side into a recess 96 in the drive housing 2, the coupling unit 24 extending through the clamping unit 95.

The clamping unit 95 is more especially designed for fluid power operation. It preferably comprises two gripping jaws 97 able to be pivoted about a pivot axis 98 extending perpendicularly to the longitudinal axis of the coupling rod 24, the coupling rod 24 extending through the two jaws and being normally so spread apart by a spring means 99 between them that they act with a clamping effect on the outer periphery of the coupling rod 24. In order to overcome the arresting action pressure medium may be supplied by way of a fluid connection 100, which shifts an actuating piston 101 against the clamping jaws 97 so that same are pivoted against the spring force into a released position, in which the coupling rod 24 is freed for the axial movement.

Since the clamping unit 95 is fitted in the housing recess 12 with a tight tolerance, play-free attachment in the stroke direction of the carriage 28 is ensured, something which ensures play-free arresting of the piston rod and accordingly also of the carriage 28 connected with it.

The invention claimed is:

1. A linear drive comprising a drive housing with longitudinal axis, a transverse axis and an upright axis in a Cartesian coordinate arrangement, such drive housing defining a longitudinally extending drive space arranged off center in the direction of the transverse axis and in which drive means are located able to be driven to perform a linear movement, such drive means being drivingly coupled with a carriage or slide adapted for linear movement externally on the drive housing and guided by way of a guide means, the guide means having two guide units which are parallel and arranged with a distance between them in a guide plane perpendicular to the upright axis, said guide units respectively including a guide track on the housing side, wherein the carriage is flanked externally by the two guide units on the longitudinal side and the guide plane in the direction of the upright axis is arranged offset in relation to the drive space, one of the guide tracks on the housing side being over the drive space so that the drive space is straddled in the direction of the transverse axis for at least some distance by a longitudinal edge section of the carriage.

2. The linear drive as set forth in claim 1, wherein the respective guide track of the housing side is essentially located over the top apex portion, orientated in the upright axis direction, of the drive space.

3. The linear drive as set forth in claim 1, wherein in the edge section adjoining the edge section, straddling the drive space, of the carriage, at least one longitudinally extending anchoring slot is formed for the attachment of sensors.

4. The linear drive as set forth in claim 1, wherein the drive means are connected with a coupling rod, which at the end extends from the drive housing and engages the carriage.

5. The linear drive as set forth in claim 1, wherein the drive housing generally has an approximately U-like transverse outline, one of the two side walls having the guide track on the housing side and the drive space and the other side wall having the other guide track.

6. The linear drive as set forth in claim 1, wherein the drive housing is defined by a cross-section center and the carriage is defined by a cross-section center, both the carriage center and the drive space being offset in the transverse direction from the drive housing center.

7. The linear drive as set forth in claim 6, wherein the drive space and the carriage center are offset from the drive housing center in opposite directions.

8. A linear drive comprising a drive housing with longitudinal axis, a transverse axis and an upright axis in a Cartesian coordinate arrangement, such drive housing defining a longitudinally extending drive space arranged off center in the direction of the transverse axis and in which drive means are located able to be driven to perform a linear movement, such drive means being drivingly coupled with a carriage or slide adapted for linear movement externally on the drive housing and guided by way of a guide means, the guide means having two guide units which are parallel and arranged with a distance between them in a guide plane perpendicular to the upright axis, said guide units respectively including a guide track on the housing side, wherein the carriage is flanked externally by the two guide units on the longitudinal side and the guide plane in the direction of the upright axis is arranged offset in relation to the drive space, one of the guide tracks on the housing side being over the drive space so that the drive space is straddled in the direction of the transverse axis for at least some distance by a longitudinal edge section of the carriage, and wherein to the side adjacent to the drive space the drive housing has a channel-like recess, whose open longitudinal side is overlapped by the carriage, the both side walls of the housing recess being respectively provided with one of the guide tracks on the housing side, the carriage covering the housing recess, dependent on the position, to a greater or lesser amount of the length.

9. The linear drive as set forth in claim 8, wherein the carriage is so sunk into the channel-like housing recess in the direction of the upright axis that it is flanked at its two longitudinal sides, respectively provided with a guide track on the carriage side, by the side walls of the housing recess.

10. The linear drive as set forth in claim 8, comprising stroke limiting means effective between the carriage and the drive housing which have a first counter abutment on the housing and which are arranged within the housing recess and are overlapped by the carriage, such first counter abutment cooperating with a first abutment arranged within the housing recess on the carriage.

11. The linear drive as set forth in claim 10, wherein the side wall farther removed from the drive space in the direction of the transverse axis, of the housing recess possesses at least one wall opening, into which the first counter abutment can be so inserted from the outside that it extends from the side into the housing recess and into the path of motion of the first abutment.

12. The linear drive as set forth in claim 11, wherein in the side wall several wall openings are provided spaced apart in the stroke direction of the carriage, such openings being able to be fitted selectively with the first counter abutment.

13. The linear drive as set forth in claim 10, wherein in the stroke direction of the carriage the first abutment is flush with a window-like opening in a terminal wall delimiting the channel-like housing recess at the end side, of the drive housing.

14. The linear drive as set forth in claim 13, wherein the end portion of the carriage facing the window-like opening forms an ejection head for the expulsion of dirt from the channel-like housing recess through the window-like opening.

15. A linear drive comprising a drive housing with longitudinal axis, a transverse axis and an upright axis in a Cartesian coordinate arrangement, such drive housing defining a longitudinally extending drive space arranged off center in the direction of the transverse axis and in which drive means are located able to be driven to perform a linear movement, such drive means being drivingly coupled with a carriage or slide adapted for linear movement externally on the drive housing and guided by way of a guide means, the guide means having two guide units which are parallel and arranged with a distance between them in a guide plane perpendicular to the upright axis, said guide units respectively including a guide track on the housing side, wherein the carriage is flanked externally by the two guide units on the longitudinal side and the guide plane in the direction of the upright axis is arranged offset in relation to the drive space, one of the guide tracks on the housing side being over the drive space so that the drive space is straddled in the direction of the transverse axis for at least some distance by a longitudinal edge section of the carriage, and wherein the drive means are connected with a coupling rod, which at the end extends from the drive housing and engages the carriage, the linear drive further comprising a clamping unit arranged in the drive housing and having the coupling rod extending through it for axially arresting the coupling rod in relation to the drive housing.

* * * * *